UNITED STATES PATENT OFFICE.

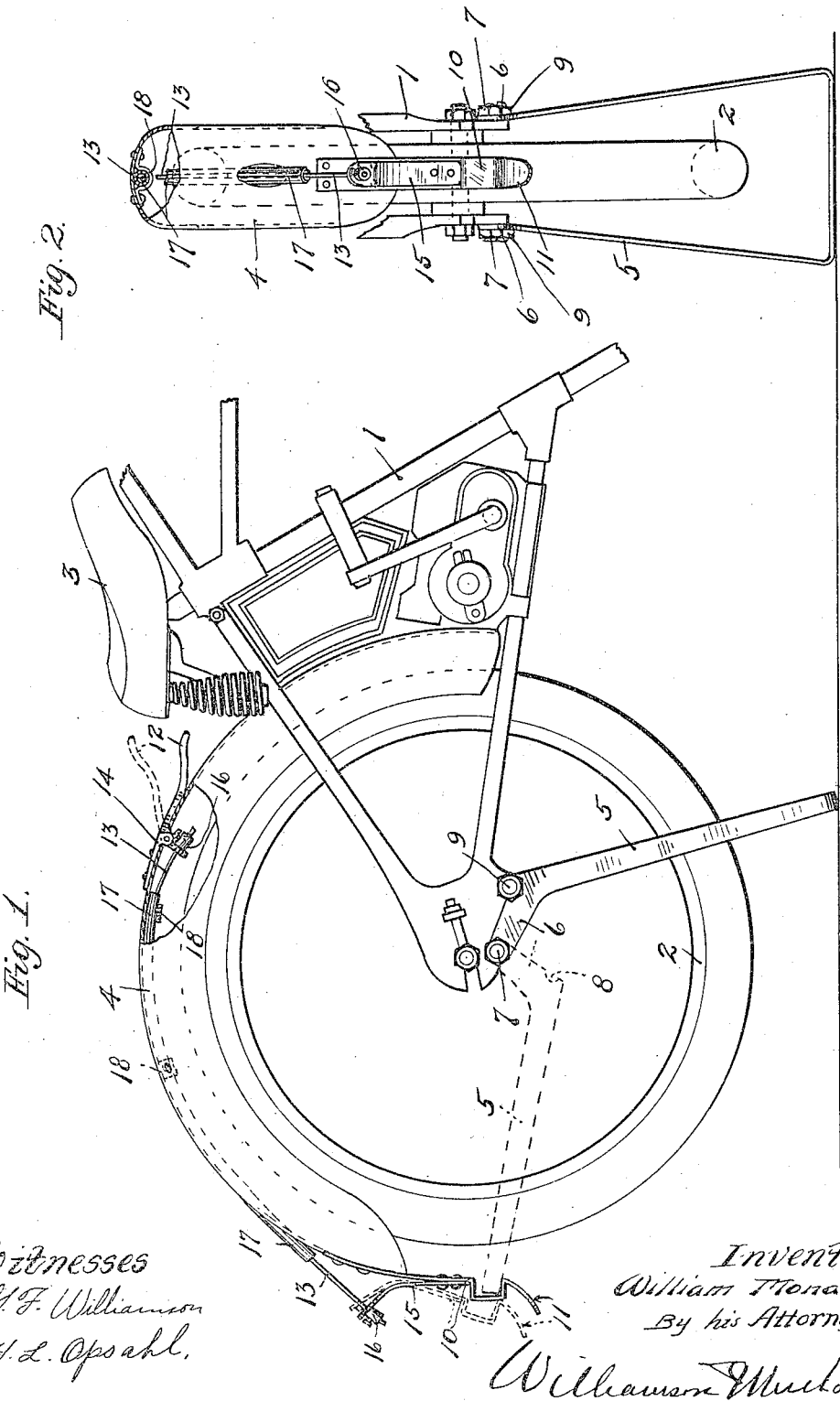

WILLIAM MONAHAN, OF MINNEAPOLIS, MINNESOTA.

LATCH-TRIP FOR BICYCLE-STANDS.

1,237,541.

Specification of Letters Patent.   Patented Aug. 21, 1917.

Application filed September 9, 1916. Serial No. 119,229.

*To all whom it may concern:*

Be it known that I, WILLIAM MONAHAN, a citizen of the United States, residing at Minneapolis, in the county of Hennepin and State of Minnesota, have invented certain new and useful Improvements in Latch-Trips for Bicycle-Stands; and I do hereby declare the following to be a full, clear, and exact description of the invention, such as will enable others skilled in the art to which it appertains to make and use the same.

My invention has for its object to provide a latch trip for bicycle stands and particularly for such stands used on heavy motor propelled bicycles, commonly called "motorcycles." To the above end, the invention consists of the novel devices and combinations of devices hereinafter described and defined in the claims.

In the accompanying drawings, which illustrate the invention, like characters indicate like parts throughout the several views.

Referring to the drawings,

Figure 1 is a fragmentary side elevation of a motorcycle having the invention incorporated therein, some parts being shown in different positions by means of broken lines; and Fig. 2 is a rear end elevation of the parts shown in Fig. 1, some parts being broken away and some parts being shown in section.

Of the parts of the motorcycle illustrated, it is only necessary to note the frame 1, rear wheel 2, seat 3, and mud guard 4 for said rear wheel.

The customary U-shape stand 5 is provided for supporting the rear wheel 2 above the ground and the machine in an upright position, when not in use. This stand 5 has a relatively long ground-engaging transverse portion which extends transversely of the wheel 2. The upwardly converging prongs of the stand terminate at their upper ends in upwardly and rearwardly projecting extensions, which are pivoted at 7 to the frame 1 close to the journal of the wheel 2. In the upper edges of the extensions 6, at their junction with the prongs of the stand 5, are segmental seats 8. These seats, when the stand 5 is in an operative position, engage rest lugs or shoulders 9 formed by securing nut-equipped bolts in the side members of the frame 1. When the rest lugs 9 are engaged by the seats 8, the stand 5 extends forward of a dead center, thereby holding the motorcycle against either forward or rearward movement.

On the rear end of the mud guard 4, is the customary spring latch 10 provided for releasably holding the stand 5 in an inoperative position. This latch is provided at its free end with a cam surface 11 arranged to be engaged by the transverse portion of the stand 5, during its movement to an inoperative position, and automatically actuate said latch to receive and hold the stand 5 in an inoperative position. The parts thus far described may be of the standard or any desired construction.

It is now customary for an operator to mount a motorcycle on its stand by releasing the stand 5 from the latch 10 by engaging said latch with his foot, while holding the motorcycle with one hand on the handle-bar and the other on the seat. As the released stand comes in contact with the roadbed, the operator gives the motorcycle a rearward movement. This rearward movement of the motorcycle rocks the stand 5 from a rearwardly inclined position to a forwardly inclined position, as shown by full lines in Fig. 1. The above described movements to release the stand 5 and mount the motorcycle thereon are difficult to make, in view of the long reach to the latch.

My present invention has for its object to provide a trip for the latch 10 that is located close to the operator's seat and so arranged that the operator can actuate the same by certain fingers of his hand, holding the seat 3.

The improved latch trip comprises a hand piece 12 and a flexible connection 13 connecting said hand piece to the latch 10. The hand piece 12 is in the form of a bell crank pivoted to a bracket 14, riveted or otherwise rigidly secured to the top of the mud guard 4 just back of the seat 3. The short end of the hand piece 12 is turned downward and extends through an aperture in the mud guard 4. On the latch 10, is an arm 15 through which one end of the flexible connection 13 is extended. The other end of the connection 13 is extended through the short arm of the hand piece 12. A pair of set screw equipped collars 16, on the extreme outer ends of the connection 13, adjustably connect the same to the hand piece 12 and arm 15. The flexible connection 13 is guided by a tube 17 through which it is extended.

This tube 17 is curved to fit the under surface of the mud guard 4 and is permanently secured thereto by clips 18. The rear end of the tube 17 is extended through the mud guard 4 to bring the connection 13 in its proper relation to the arm 15. The connection 13 may be made from a piece of wire or other suitable flexible material. While the arm 15 is shown secured by rivets to the latch 10, it is, of course, understood that the same may be an integral part thereof.

The tension of the latch 10, through the connection 13, holds the hand piece 12 in a position, as shown, by full lines in Fig. 1, where the same can be easily manipulated by the operator, when lifting the motorcycle by taking hold of the seat 3. By lifting the hand piece 12, as shown by broken lines, in Fig. 1, the latch 10 is moved into an inoperative position, and the stand 5 released.

The above described invention, while extremely simple, is of comparatively small cost to manufacture and when applied to a motorcycle, is almost entirely concealed by the rear mud guard.

What I claim is:—

1. A bicycle having a segmental mud guard for its rear wheel and a stand pivoted to its frame, in combination with a latch and a hand piece mounted on the mud guard on opposite sides of the crown thereof, said latch being secured to the rear end of the mud guard and adapted to hold said stand in an inoperative position, of a flexible connection between the latch and hand piece, and a guide at the crown and on the inside of the mud guard for said connection.

2. A bicycle having a stand pivoted to the frame thereof and provided with a latch for holding said stand in an inoperative position, in combination with a handpiece secured to the rear mud guard, of a flexible connection between the latch and handpiece, and a tubular guard secured to the mud guard and incasing the flexible connection, except at its end portions.

3. A bicycle having a stand pivoted to the frame thereof and provided with a latch for holding said stand in an inoperative position, in combination with a hand piece secured to the rear mud guard, of a curved tube secured to the under side of said mud guard and having its rear end extended therethrough, and a flexible connection between the latch and hand piece and extended through said tube.

In testimony whereof I affix my signature in presence of two witnesses.

WILLIAM MONAHAN.

Witnesses:
CLARA DEMAREST,
HARRY D. KILGORE.

Copies of this patent may be obtained for five cents each, by addressing the "Commissioner of Patents, Washington, D. C."